(12) United States Patent
Zheng et al.

(10) Patent No.: US 10,935,678 B2
(45) Date of Patent: *Mar. 2, 2021

(54) MONITORING SYSTEM FOR DEFORMATIONS AND DESTRUCTIONS OF GAS STORAGE

(71) Applicant: Research Institute of Petroleum Exploration & Development, PetroChina Company Limited, Beijing (CN)

(72) Inventors: Dewen Zheng, Beijing (CN); Zhide Wu, Beijing (CN); Guosheng Ding, Beijing (CN); Huayin Zhu, Beijing (CN); Jianfeng Liu, Beijing (CN); Lina Ran, Beijing (CN); Tong Lin, Beijing (CN)

(73) Assignee: RESEARCH INSTITUTE OF PETROLEUM EXPLORATION & DEVELOPMENT, PETROCHINA COMPANY LIMITED, Beijing (CN)

( * ) Notice: Subject to any disclaimer, the term of this patent is extended or adjusted under 35 U.S.C. 154(b) by 324 days.

This patent is subject to a terminal disclaimer.

(21) Appl. No.: 16/016,710

(22) Filed: Jun. 25, 2018

(65) Prior Publication Data

US 2018/0372892 A1 Dec. 27, 2018

(30) Foreign Application Priority Data

Jun. 23, 2017 (CN) .......................... 2017 1 04871537

(51) Int. Cl.
*G01V 1/135* (2006.01)
*G01V 1/16* (2006.01)

(52) U.S. Cl.
CPC .............. *G01V 1/135* (2013.01); *G01V 1/166* (2013.01); *G01V 2210/1429* (2013.01)

(58) Field of Classification Search
CPC . G01V 1/135; G01V 1/166; G01V 2210/1429
USPC ...................................................... 73/152.51
See application file for complete search history.

(56) References Cited

U.S. PATENT DOCUMENTS

2018/0364377 A1* 12/2018 Liu ....................... G01V 1/166

* cited by examiner

*Primary Examiner* — John Fitzgerald
*Assistant Examiner* — Rodney T Frank
(74) *Attorney, Agent, or Firm* — Bayramoglu Law Offices LLC

(57) ABSTRACT

The invention discloses a monitoring system for deformations and destructions of a gas storage, including an acoustic emission sensor installed in a borehole of a monitored rock mass and a ground workstation. The acoustic emission sensor includes an acoustic emission probe and a probe installation mechanism for installing the acoustic emission probe and a transmission mechanism for transmitting the probe installation mechanism. The probe installation mechanism includes a shell, a probe sleeve and two sets of pistons hydro-cylinder components. The present invention realizes the control of the moving direction of the shell and the probe sleeve by the piston hydro-cylinder component and the hydraulic pump, thus solving the problem of effective installation and coupling of the acoustic emission probe, ensuring the effective coupling between the acoustic emission probe and the wall of the borehole.

14 Claims, 7 Drawing Sheets

MONITORING SYSTEM FOR DEFORMATIONS AND DESTRUCTIONS OF GAS STORAGE

CROSS REFERENCE TO RELATED APPLICATIONS

This application is based upon and claims priority to Chinese Patent Application No. CN 2017104871537, field on Jun. 23, 2017, the entire content of which is incorporated herein by reference.

TECHNICAL FIELD

The present invention relates to the technical field of rock (rock mass) engineering safety monitoring in engineering construction, particularly to a monitoring system for deformations and destructions of a gas storage.

BACKGROUND

Rock (rock mass) deformation and destruction in engineering construction, especially rock burst dynamic disaster, which may directly endanger the construction safety of the project and even cause catastrophic impact. Therefore, effective monitoring and forecast of rock (rock mass) stability and rock burst dynamic disaster is one of the important contents of construction safety of the project. At present, acoustic emission, as an important means of non-destructive monitoring, is used for the monitoring and forecast of rock (rock mass) stability and rock burst dynamic disaster in the engineering construction.

During the construction of surrounding rock excavation in underground engineering, in order to accurately predict the possible deformation and destruction of surrounding rock and dynamic disaster, acoustic emission sensors need to be arranged in advance in the form of three-dimensional spatial distribution placement in the area of the monitored surrounding rock before the excavation begins. If more sensors are arranged in the surrounding area, then the measuring accuracy will be higher.

In a specific implementation, a drilling rig is needed to drill a hole in a rock (rock mass) before excavating the rock (rock mass). The drilling depth increases with the increase of the burial depth of the project and the monitored area. However, the deeper the borehole, the harder the installation of the acoustic emission sensor. At present, the installation methods of acoustic emission sensors include the following types:

(1) At the engineering site, the acoustic emission probe is directly placed in the borehole, and the remaining liquid medium (such as water) in the borehole is used as the medium for signal transmission between the rock mass and the acoustic emission probe. The acoustic emission probe transmits the received detection signal to the ground monitoring system through the cable. However, this method has the following disadvantages: ① This implementation is only suitable for the borehole with a downward direction, but it is not suitable for the borehole which is totally horizontal or having an upward angle since storing the medium is difficult; even for the downward borehole, the rock mass around the borehole still needs to be relatively intact, so as to avoid the loss or leakage of transmission medium from the borehole cracks, ensuring the acoustic emission probe is in the transmission medium all the time, but in practical situation at the site, it is difficult to meet this requirement, thereby affecting the monitoring effect. ② Although the liquid between the rock mass and the acoustic emission probe may be used as a coupling medium for signal transmission, generally the density of the liquid is relatively low, and the signal transmission effect is not as good as compared to the detection signal received by directly having the transmitting probe be in effective contact with the rock wall.

(2) In order to ensure the effective coupling between the acoustic emission probe placed in the borehole and the borehole wall, cement may be poured into the borehole at the engineering site, so that the acoustic emission probe and the rock wall are casted as a whole. The problem of effective transmission of the detection signal may be solved by the method, but the following defects still exist: ① The acoustic emission probe after casting cannot be recycled, resulting in excessive monitoring costs. ② After casting, if the acoustic emission probe has no signal or has bad signal, the acoustic emission probe cannot be inspected or adjusted, only a new acoustic emission probe can be installed in a re-drilling hole, which not only leads to higher monitoring costs, but also leads to prolonged project progress, along with a delayed construction period. ③ While pouring cement slurry into the borehole, the grouting effect of the acoustic emission probe mounting site is difficult to guarantee due to the depth of the borehole. Additionally, the acoustic emission probe mounting site may fail to be grouted effectively, thus the acoustic emission probe is not coupled to the rock wall effectively and thereby yielding no monitoring signal. On the other hand, the deeper the borehole, the greater the total shrinkage deformation of the cement is after it becomes solidified. The signal transmission cable of the acoustic emission probe cemented with the cement will bear the tension due to the shrinkage and deformation of cement, thus the signals cannot be transmitted effectively. ④ Explosive blasting during excavation may loosen the grouting surface and the rock wall surface, resulting in the reduction of the effectiveness of monitoring signal transmission. ⑤ Generally the interior of the borehole is relatively moist causing a delay for the cement slurry to solidify after grouting, which results in an extension of the construction period; and the installation process is time-consuming and labor-consuming, requiring a series of professional grouting equipment and grouting personnel, thereby further increasing the monitoring cost.

(3) Another implementation method is to use a simple fixing installation device. The acoustic emission probe is fixed inside the device, and then a non-movable rigid metal transmission rod is used to transmit the fixing device to the installation site, and then the pressure is used to push the acoustic emission probe out to contact the borehole rock wall thereby achieving the fixation. The advantage is that the contact between the acoustic emission probe and the rock wall is achieved without grouting. However, the following disadvantages still exist: ① In this method, since the distance between the fixing installation device and the borehole wall is very short, the fixing installation device and the borehole need to be concentric structures, and the hole wall needs to be smooth. But these requirements are hard to guarantee in actual construction. ② Since the size of the fixing installation device is relatively large, this method is only suitable for the boreholes with large diameters, resulting in higher drilling costs. ③ The entire transmission rod and installation device are rigidly inserted into the boreholes. Not only is the frictional force large, but the cables or acoustic emission probes are easily worn out. Also, the transmission rod and installation device may get stuck in the borehole, thereby preventing the part to be correctly installed. ④ Since the fixing installation device is rigidly inserted into the borehole by the external force, the installation process is not only time-consuming and labor-consuming, but also has extremely low work efficiency. ⑤ Since the borehole wall is a cylindrical surface, and the end surface of the acoustic emission probe is a plane, how to ensure the effective coupling between the acoustic emission probe end surface and the borehole wall is also a problem to be solved in practical applications.

Based on the drawbacks and deficiencies in the above-mentioned various implementations, the acoustic emission detection is limited in the promotion and application of rock (rock mass) stability and rock burst dynamic disaster monitoring.

Therefore, how to conveniently and effectively install the acoustic emission probe in the borehole and effectively couple the installed acoustic emission probe with the borehole wall are still difficulties of on-site monitoring and research, which is short of relevant test methods and technical support.

SUMMARY

The purpose of the present invention is to provide a monitoring system for deformations and destructions of a gas storage in view of the deficiencies in the prior art, which is not only convenient to be installed, but also easy to achieve the effective coupling between the acoustic emission probe and the borehole wall, ensuring the effectiveness of the detection signal of the acoustic emission probe.

The monitoring system for deformations and destructions of the gas storage of the present invention includes a hydraulic acoustic emission sensor and a ground workstation. The hydraulic acoustic emission sensor is installed in a borehole of a monitored rock mass and used to transmit the received monitoring signal to the ground workstation through a cable. The computer in the ground workstation processes and displays the monitoring signal from the acoustic emission sensor. The hydraulic acoustic emission sensor includes an acoustic emission probe, a probe installation mechanism and a transmission mechanism transmitting the probe installation mechanism installed with the acoustic emission probe to a setting position in the borehole. The number of the acoustic emission probes is at least one. The number of the probe installation mechanisms is the same as the number of the acoustic emission probes. The ground workstation further includes a hydraulic pump and an oil tank. The probe installation mechanism includes a shell, a probe sleeve, an end cap, a piston hydro-cylinder component and a connection component. The shell is a thin-walled cylindrical body with two open ends, and the inner hole of the shell is provided with a guide cylinder for combining with the probe sleeve. The guide cylinder is located at the bottom of the inner wall of the shell, and the inner hole is a through hole penetrating through the shell wall, the centerline thereof is perpendicular to the centerline of the shell. The probe sleeve is a cylinder with a closed lower end and an open upper end. The inner hole of the probe sleeve is in clearance fit with the acoustic emission probe, and the outer shape of the probe sleeve is in clearance fit with the inner hole of the guide cylinder. The lower end surface of the probe sleeve is an arc surface matched with the arc of the borehole of the monitored rock mass. The upper end of the cylinder wall is provided with one or two notches for extending out the cable connector of the acoustic emission probe. The outer wall of the lower part of the notch is provided with a shaft shoulder. If there are two notches, both notches are axial symmetrically arranged relative to the centerline of the probe sleeve. The piston hydro-cylinder component has two sets, the structures of two sets of the piston hydro-cylinder components are identical. Each of the two sets of the piston hydro-cylinder components includes a piston, a piston rod and a hydro-cylinder. The hydro-cylinders of two sets of the piston hydro-cylinder components are symmetrically arranged at the left upper side and the right upper side of the inner wall of the shell, respectively. The axes of two hydro-cylinders are parallel to the axis of the guide cylinder, and axes of two hydro-cylinders and the axis of the guide cylinder are on a same plane. The distance between the inner sides of two hydro-cylinders is greater than the size of the end cap. Two sets of the connection components are included. Two sets of the connection components are installed at the two ends of the shell respectively. The acoustic emission probe is installed in the probe sleeve, and the cable connector thereof extends out from the notch provided on the wall of the probe sleeve. The end cap covers the upper end surface of the probe sleeve and is connected to the probe sleeve in a detachable manner. The probe sleeve is installed with the acoustic emission probe and then placed in the shell, the lower section of the probe sleeve is inserted into the guide cylinder arranged in the shell and the lower end of the probe sleeve is located outside the shell. The placement position of the probe sleeve is supposed to make the cable connector of the acoustic emission probe face the end of the shell. Pistons of two sets of the piston hydro-cylinder components are respectively arranged in their own oil tanks. In each of the two sets of the piston hydro-cylinder components, one end of the piston rod is fixedly connected to the piston, the other end of the piston rod is fixedly connected to a corresponding part of the top surface of the shaft shoulder. The oil inlet of the hydro-cylinder of each of the two sets of the piston hydro-cylinder components communicates with the hydraulic pump through the oil pipeline. The oil return port of the hydro-cylinder communicates with the oil tank through the oil pipeline. The transmission mechanism is connected to the connection component installed on the shell.

The above-mentioned monitoring system for deformations and destructions of the gas storage is provided with a hydraulic pressure gauge on the oil pipeline connecting the oil inlet of the hydro-cylinder with the hydraulic pump, making it easier to monitor the pressure in the hydro-cylinder.

In the above-mentioned monitoring system for deformations and destructions of the gas storage, the top of the hydro-cylinder may be fixedly connected to the inner wall of the shell through welding or a threaded connection or may be an integrated structure with the shell.

In the above-mentioned monitoring system for deformations and destructions of the gas storage, the connection component includes a nut and at least two sets of connection brackets. One end of each connection bracket is evenly distributed around the outer wall of the nut and is hinged with the outer wall of the nut. The other end of each connection bracket is fixedly connected to the shell. This kind of connection component allows the installation mechanism to achieve a small rotation within a limited range, thereby further ensuring that the top of the shell and the bottom of the probe sleeve are in effective coupling contact with the borehole wall.

In the above-mentioned monitoring system for deformations and destructions of the gas storage, the transmission mechanism is formed by a combination of a transmission rod, a connection rod and a roller component. The central portion of one end of the transmission rod is provided with a connection screw hole. The central portion of the other end of the transmission rod is provided with a connection hole, and a first fastening screw is arranged on the wall of the connection hole. The type and size of the internal thread of the connection screw hole are the same as those of the internal thread of the nut in the connection component. The connection rod includes a thread section and a column section, and is used for a connection between the transmission rod and the connection component and also a connection between the transmission rods. The type and size of the external thread of the thread section are matched with those of internal thread of the connection screw hole provided in the transmission rod. The shape and size of the column section are matched with those of the connection hole provided in the transmission rod. When the column section of the connection rod is inserted into the connection hole of the transmission rod, the column section is fixed by the first fastening screw. The roller component includes rollers, U-shaped installation plates, axles and a roller sleeve. The number of rollers is two or three. The number of U-shaped installation plates and the number of axles are the same as the number of rollers. Each roller is respectively installed on a corresponding axle. Both ends of each axle are respectively installed on the two side plates of the corresponding U-shaped installation plate, so that each roller is respectively located between the two side plates of the corresponding U-shaped installation plate. The inner hole of the roller sleeve is larger than the outer size of the transmission rod, and a second fastening screw is arranged on the wall of the roller sleeve. Each U-shaped installation plate is fixedly connected to the outer side of the wall of the roller sleeve respectively. When the number of U-shaped installation plates is two, the included angle between centerlines of the two U-shaped installation plates is 120° to 135°. When the number of U-shaped installation plates is three, the centerlines of two U-shaped installation plates therein are on a straight line, and the included angles between the centerline of the remaining U-shaped installation plate and the centerlines of the above-mentioned two U-shaped installation plates are both 90°. At least one set of roller components is configured for each transmission rod. The roller sleeve of the roller component is sleeved on the transmission rod and fixed by the second fastening screw.

In the above-mentioned monitoring system for deformations and destructions of the gas storage, in order to transmit the probe installation mechanism to a deeper borehole, multiple transmission rods may be used. Two adjacent transmission rods are connected by a connection rod, and the transmission rod is fixedly connected to the connection rod through the first fastening screw. In the process of installation and disassembly, the two adjacent transmission rods do not need to be rotated in this connection method. On one hand, the friction between the probe installation mechanism and the borehole caused by the rotation of the transmission rods may be prevented, on the other hand, the influence on use caused by the abrasion of the oil pipeline connected to the hydro-cylinder caused by the rotation of the transmission rods may be avoided. In a preferred embodiment, in order to facilitate the transmission of the oil pipeline and reduce the abrasion, the oil pipeline and the transmission rod may also be fixed together along the axial direction.

In the above-mentioned monitoring system for deformations and destructions of the gas storage, in order to make it easier to fix the roller component, the transmission rod and the connection rod together, the first fastening screw and the second fastening screw may be the same fastening screw. During the installation, the fastening screw hole of the transmission rod is aligned with the fastening screw hole on the roller sleeve first, and then the fastening screw is used to pass through the fastening screw holes of the transmission rod and the roller sleeve, and the fastening screw is pressed against the column section of the connection rod to fix the roller component, the transmission rod and the connection rod together.

In the above-mentioned monitoring system for deformations and destructions of the gas storage, in order to conveniently install the piston hydro-cylinder component, the shell is formed by combining two semi-cylinders.

In the above-mentioned monitoring system for deformations and destructions of the gas storage, in order to conveniently draw forth the cable connected to the acoustic emission probe, the notch provided for extending out the cable connector of the acoustic emission probe is arranged on the upper end of the wall of the probe sleeve is a U-shaped notch. The width of the U-shaped notch is slightly larger than the diameter of the cable connector of the acoustic emission probe.

In the above-mentioned monitoring system for deformations and destructions of the gas storage, in order to further improve the signal transmission effect of the acoustic emission probe, a coupling agent may be coated on the lower end surface of the acoustic emission probe contacting the bottom of the probe sleeve, so that the lower end surface of the acoustic emission probe and the bottom of the probe sleeve are in effective contact. The coupling agent is butter, vaseline, etc.

In the above-mentioned monitoring system for deformations and destructions of the gas storage, the number of probe installation mechanisms is the same as the number of the acoustic emission probes. A plurality of acoustic emission probes may be arranged in the same borehole along the axial direction according to actual needs. The orientations of different acoustic emission probes may be configured according to actual monitoring requirements. Two adjacent acoustic emission sensors are connected by a transmission mechanism.

The working principle of the monitoring system for deformations and destructions of the gas storage of the present invention is as follows. In the initial state, the piston is at the upper initial point under the action of the pressure oil. Meanwhile, the overall size of the combination of the acoustic emission probe and the probe installation mechanism is smaller than the size of the borehole to be installed. Thus, the combination of the emission probe and the probe installation mechanism may move freely in the borehole. When the combination of the acoustic emission probe and the probe installation mechanism is sent to a predetermined position of the borehole, the pressure oil entering the hydro-cylinder through the oil pipeline pushes the piston to move to a lower initial point under the action of the hydraulic pump. Thus, the piston rod pushes the probe sleeve to move towards the direction away from the shell, so that the top of the shell and the lower end surface of the probe sleeve are respectively in close contact with the inner wall of the borehole, so that the combination of the acoustic emission probe and the probe installation mechanism is in the monitored state. When the acoustic emission probe needs to be recycled after the monitoring, the pressure oil entering the hydro-cylinder through the oil pipeline pushes the piston to move to the upper initial point under the action of the hydraulic pump. Driven by the piston rod, the lower end surface of the probe sleeve is separated from the inner wall of the borehole. The combination of the acoustic emission probe and the probe installation mechanism gradually recovers to the initial state, so that the acoustic emission probe is convenient to be recycled.

Compared with the prior art, the present invention has the following beneficial effects:

1. In the monitoring system for deformations and destructions of the gas storage of the present invention, the probe installation mechanism in the acoustic emission sensor controls the direction of movement of the shell and the probe sleeve through the piston hydro-cylinder component and the hydraulic pump, thereby solving the problems of the effective installation and coupling of the acoustic emission probe. The size of the combination of the acoustic emission probe and the probe installation mechanism is smaller than the size of the borehole in the initial state. When the combination of the acoustic emission probe and the probe installation mechanism is sent to a predetermined position, the pressure oil entering the hydro-cylinder through the oil pipeline pushes the piston to move towards the lower initial point under the action of the hydraulic pump. Thereby, the piston rod pushes the probe sleeve to move toward the direction away from the shell, so that the top of the shell and the lower end surface of the probe sleeve are respectively in close contact with the inner wall of the borehole, thereby ensuring the acoustic emission probe is effectively coupled with the inner wall of the borehole. The acoustic emission sensor transmits the received monitoring signal to the ground workstation and the computer of the ground workstation displays the monitoring signal.

2. In the monitoring system for deformations and destructions of the gas storage of the present invention, the pressure in the hydro-cylinder is monitored through a hydraulic pressure gauge. If the decrease in pressure caused by the deformation of the rock mass is found, the hydraulic pump may be used to supply the pressure, thus the acoustic emission probe and the wall of the borehole are always in an effective coupling state.

3. In the monitoring system for deformations and destructions of the gas storage of the present invention, when the monitoring is completed, under the action of a hydraulic pump, the pressure oil entering the hydro-cylinder through the oil pipeline pushes the piston to move to the upper initial point. Driven by the piston rod, the lower end surface of the probe sleeve is separated from the inner wall of the borehole. The probe installation mechanism gradually recovers to the initial state, which facilitates the removal of the sensor from the borehole and realizes the ability to recycle and reuse the acoustic emission sensor, saving the monitoring cost.

4. In the monitoring system for deformations and destructions of the gas storage of the present invention, the top of the shell and the lower end surface of the probe sleeve used in the acoustic emission sensor are arc-shaped coupling surfaces matched with the wall of the borehole, ensuring the coupling effect of the acoustic emission probe and the wall of the borehole. Thus, reliability of the monitoring and forecasting of engineering rock (rock mass) stability and rock burst dynamic disaster are enhanced.

5. In the monitoring system for deformations and destructions of the gas storage of the present invention, the transmission rod of the transmission mechanism may be formed by connecting a plurality of transmission rods, which is not only convenient to install, but also unaffected by the depth and orientation of the borehole, thus having a wide application range.

6. In the monitoring system for deformations and destructions of the gas storage of the present invention, the transmission mechanism used in the acoustic emission sensor is designed with a roller component, the rolling transmission during the installation process may be realized, thereby reducing the influence of the friction of the borehole wall in the process of installation and transmission. The integrity of the acoustic emission sensors and transmission cables is ensured.

7. In the monitoring system for deformations and destructions of the gas storage of the present invention, the connection brackets fixedly connected at the two ends of the shell of the acoustic emission sensor are hinged with the nuts. Therefore, the shell and the transmission mechanism may rotate in a small range within a certain scope, thereby further ensuring the top of the shell and the bottom of the probe sleeve are in effective coupling contact with the borehole wall.

8. In the monitoring system for deformations and destructions of the gas storage of the present invention, the acoustic emission sensor is simple in structure, convenient to install and disassemble, reducing the labor intensity and saving a large amount of labor costs.

9. In the monitoring system for deformations and destructions of the gas storage of the present invention, in order to meet different requirements, a plurality of probe installation mechanisms may be connected through a plurality of transmission rods to achieve the purpose of arranging a plurality of acoustic emission probes in the same borehole. The end surface of each acoustic emission probe may be determined according to the monitoring needs respectively, thereby improving the monitoring efficiency of engineering rock (rock mass) stability and rock burst dynamic disaster.

Figure 1:
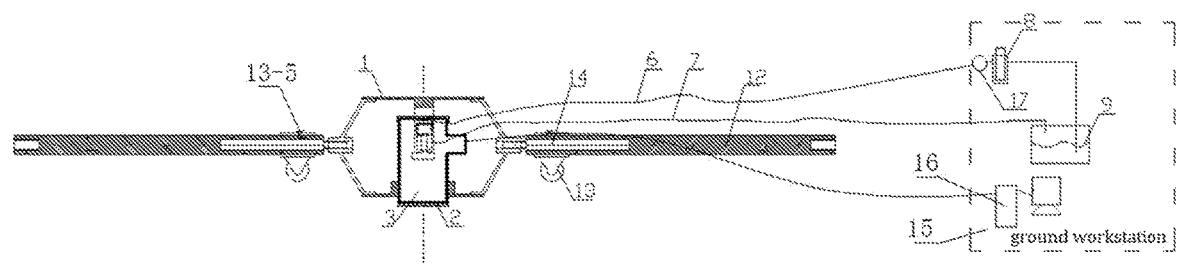
FIG. 1 is a structural schematic view of a monitoring system for deformations and destructions of a gas storage according to the present invention, the probe sleeve is in a state of moving toward the borehole wall.

In the drawings: 1, shell, 1-1, semi-cylinder, 1-2, connection piece, 2, probe sleeve, 2-1, cylinder, 2-2, end cap, 2-3, shaft shoulder, 2-4, notch, 3, acoustic emission probe, 3-1, cable connector 4, piston hydro-cylinder component, 4-1, hydro-cylinder, 4-2, piston rod, 4-3, piston, 5, guide cylinder, 6, first oil pipeline, 7, second oil pipeline, 8, hydraulic pump, 9, oil tank, 10, connection bracket, 11, nut, 12, transmission rod, 12-1, connection hole, 12-2, connection screw hole, 12-3, first fastening screw, 13, roller component, 13-1, roller, 13-2, U-shaped installation plate, 13-3, axle, 13-4, roller sleeve, 13-5, second fastening screw, 14, connection rod, 14-1, thread section, 14-2, column section, 15, ground workstation, 16, computer, 17, hydraulic gauge.

DETAILED DESCRIPTION

The technical solution of the monitoring system for deformations and destructions of the gas storage of the present invention will be clearly and completely described below through embodiments and with reference to the drawings. Obviously, the described embodiments are merely a part of the embodiments of the present invention, rather than all of the embodiments. All other embodiments obtained by those of ordinary skills in the art based on the embodiments of the present invention without creative efforts shall fall within the protection scope of the present invention.

Figure 2:
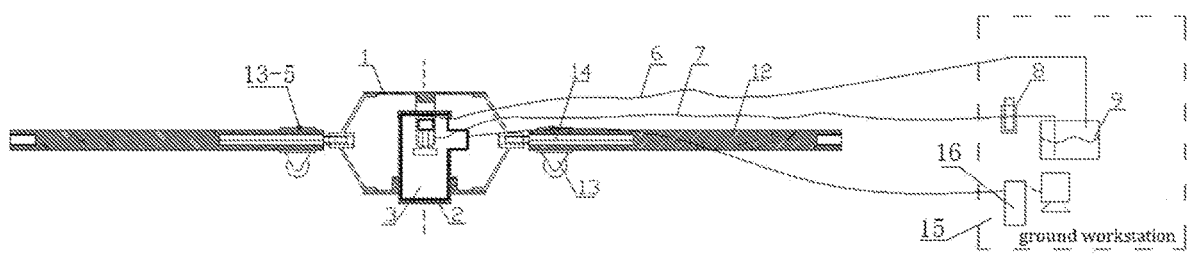
FIG. 2 shows a state that the probe sleeve in FIG. 1 moves toward the opposite direction to the borehole wall.

The monitoring system for deformations and destructions of the gas storage provided by this embodiment is shown in FIG. 1 and FIG. 2, including an acoustic emission sensor and a ground workstation 15. The acoustic emission sensor is used to be installed in a borehole of the monitored rock mass and transmit the received monitoring signal to the ground workstation through a cable. The computer 16 in the ground workstation processes and displays the monitoring signal from the acoustic emission sensor. The acoustic emission sensor includes an acoustic emission probe 3, a probe installation mechanism and a transmission mechanism transmitting the probe installation mechanism installed with the acoustic emission probe to a setting position in the borehole. The number of the acoustic emission probes 3 and the number of the probe installation mechanisms are both one. The ground workstation 15 further includes the hydraulic pump 8 and the oil tank 9.

Figure 7:
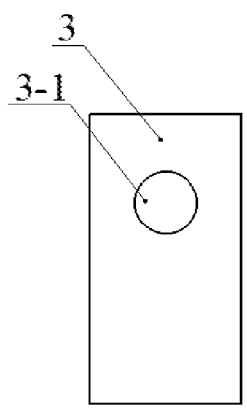
FIG. 7 is a schematic view of an acoustic emission probe in the monitoring system for deformations and destructions of the gas storage according to the present invention.
Figure 8:
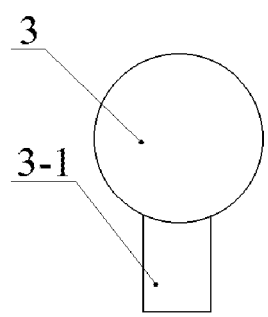
FIG. 8 is a top view of FIG. 7.

As shown in FIG. 7 and FIG. 8, the above-mentioned acoustic emission probe 3 is in a cylindrical structure, a cable connector 3-1 extends from the side, and one end surface of the acoustic emission probe 3 is coated with butter.

Figure 3:
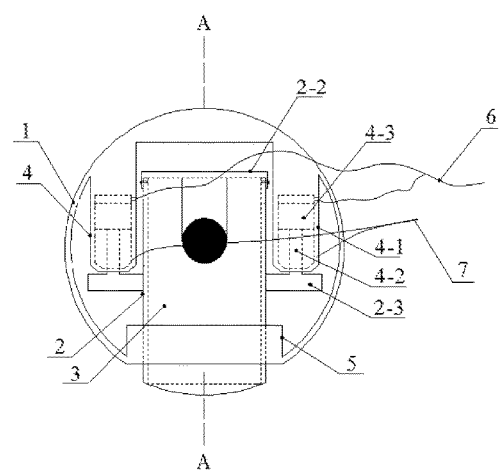
FIG. 3 is a schematic view of a combination of an acoustic emission probe and a probe installation mechanism in the monitoring system for deformations and destructions of the gas storage according to the present invention.
Figure 4:
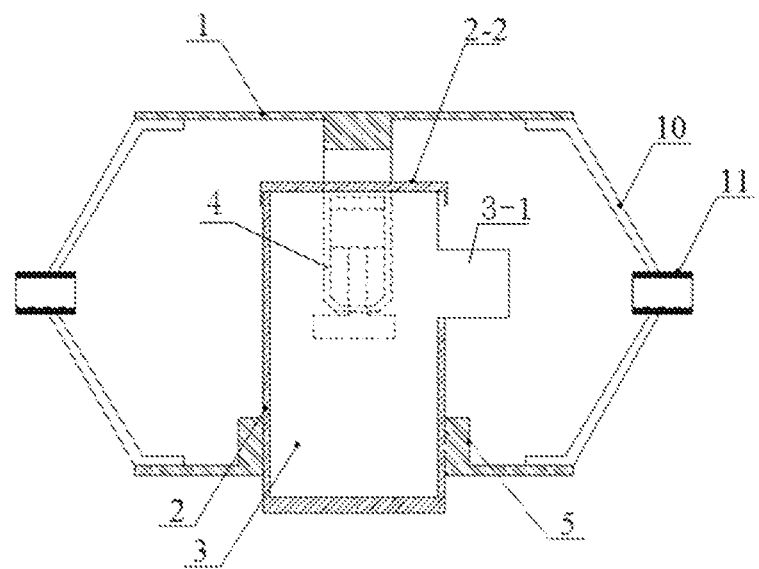
FIG. 4 is an A-A sectional view of FIG. 3.

As shown in FIG. 3 and FIG. 4, the above-mentioned probe installation mechanism includes a shell 1, a probe sleeve 2, an end cap 2-2, a piston hydro-cylinder component 4 and a connection component.

Figure 5:
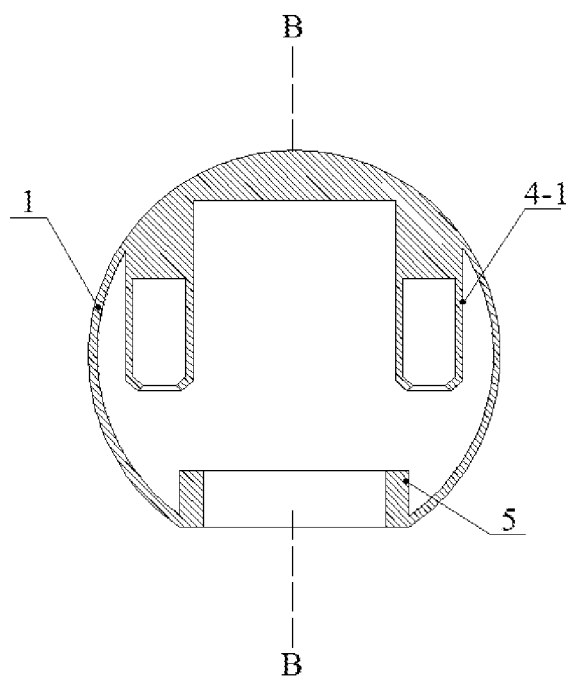
FIG. 5 is a structural schematic view of a shell in a probe installation mechanism.
Figure 6:
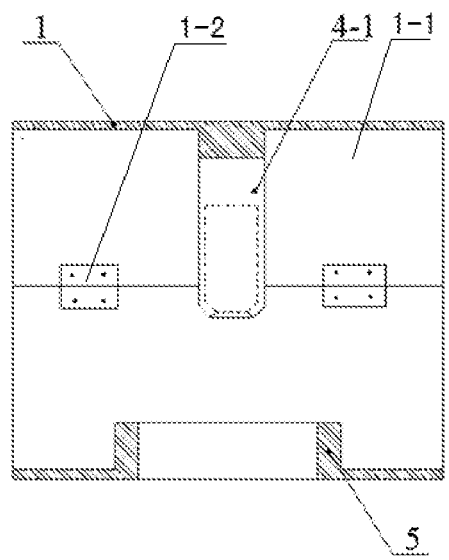
FIG. 6 is a B-B sectional view of FIG. 5.

As shown in FIG. 5 and FIG. 6, the shell 1 is a cylindrical body with two open ends and is formed by combining two semi-cylinders through connection piece 1-2, the inner hole of the shell is provided with a guide cylinder 5 used for combining with the probe sleeve 2. The guide cylinder 5 is located at the bottom of the inner wall of the shell and the inner hole is a through hole penetrating the shell wall, the centerline thereof is perpendicular to the centerline of the shell.

Figure 9:
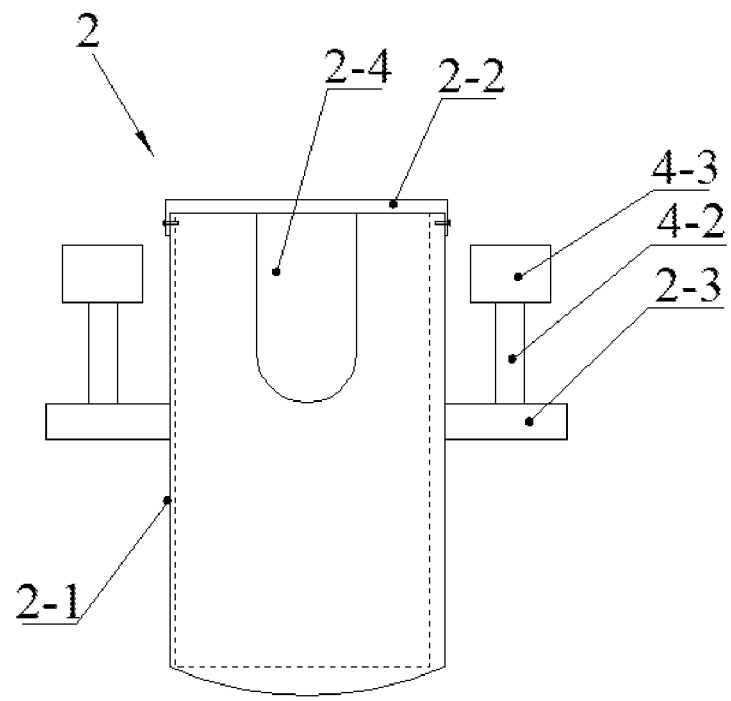
FIG. 9 is a structural schematic view of a probe sleeve in a probe installation mechanism.

As shown in FIG. 9, the above-mentioned probe sleeve 2 is a cylinder 2-1 with a closed lower end and an open upper end. The inner hole of the probe sleeve 2 is in clearance fit with the acoustic emission probe 3, and the outer shape of the probe sleeve 2 is in clearance fit with the inner hole of the guide cylinder 5. The lower end surface of the probe sleeve is an arc surface matched with the arc of the borehole of the monitored rock mass. The upper end of the cylinder wall is provided with a U-shaped notch 2-4 for extending out the cable connector 3-1 of the acoustic emission probe. The outer wall of the lower part of the notch is provided with shaft shoulder 2-3.

As shown in FIG. 3, FIG. 4 and FIG. 9, two sets of the above-mentioned piston hydro-cylinder components are included. The structure of two sets of the piston hydro-cylinder component are identical, both include a piston 4-3, a piston rod 4-2 and a hydro-cylinder 4-1. The hydro-cylinders 4-1 of two sets of the piston hydro-cylinder components are symmetrically arranged on the left upper side and the right upper sides of the inner wall of the shell. And axes of two hydro-cylinders are parallel to the axis of the guide cylinder, and axes of two hydro-cylinders and the axis of the guide cylinder are on a same plane. The distance between inner sides of two hydro-cylinders 4-1 is larger than the size of end cap 2-2. The piston 4-3 in each set of the piston hydro-cylinder component is located inside the hydro-cylinder 4-1. One end of the piston rod 4-2 is in threaded connection with the piston 4-3, the other end of the piston rod 4-2 extends out of the hydro-cylinder 4-1. The top of the hydro-cylinder 4-1 is fixedly connected to the inner wall of the shell 1 by welding. The upper part of the hydro-cylinder cylinder 4-1 is designed with a first oil port connected to the first oil pipeline 6. The lower part of the hydro-cylinder 4-1 is designed with a second oil port communicating with the second oil pipeline 7. When the first oil port is the oil inlet, the second oil port is the oil return port; when the second oil port is the oil inlet, the first oil port is the oil return port.

Figure 10:
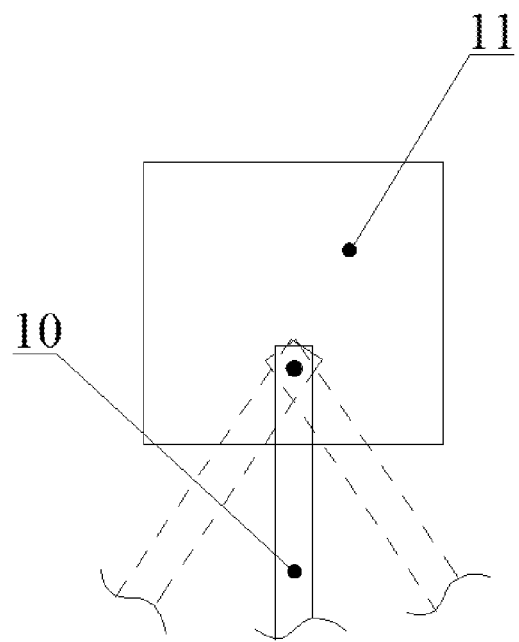
FIG. 10 is a schematic view of a connection mode between a nut and a connection bracket of a connection component in a probe installation mechanism.
Figure 11:
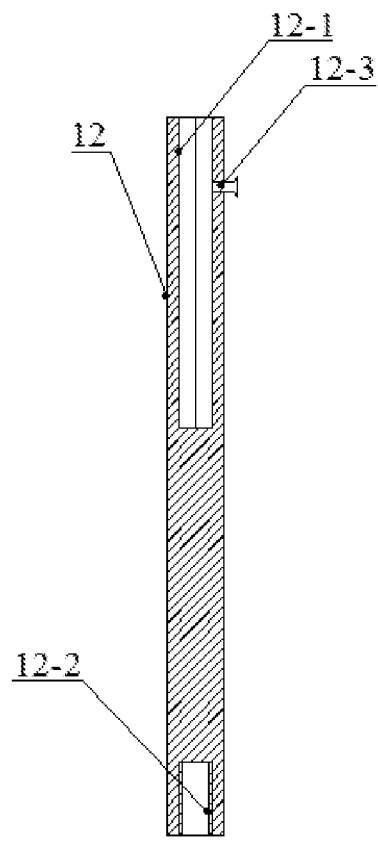
FIG. 11 is a structural schematic view of a transmission rod in a transmission mechanism.
Figure 12:
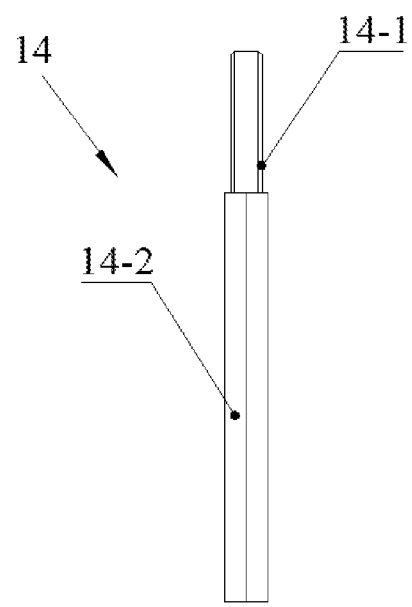
FIG. 12 is a structural schematic view of a connection rod in the transmission mechanism.
Figure 13:
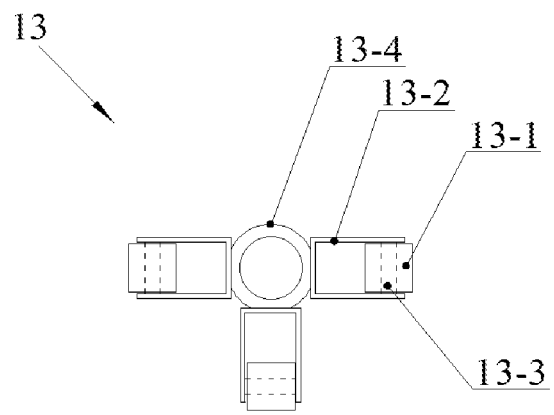
FIG. 13 is a structural schematic view of a roller component in the transmission mechanism.

As shown in FIG. 4 and FIG. 10, two sets of the above-mentioned connection components are included, which are respectively installed at two ends of the shell 1. Each set of the connection component includes a nut 11 and two sets of connection brackets 10. One end of the connection bracket 10 is welded to the inner wall of the shell 1, and the other end is hinged to the outer wall of the nut 11. Through the connection component, the transmission mechanism may be installed at both ends of the shell 1, thus not only the transmission of the acoustic emission sensor within the borehole is facilitated, but also a plurality of probe installation mechanisms are connected through the transmission rods, realizing the purpose of arranging a plurality of acoustic emission probes in the same borehole.

As shown in FIG. 1, FIG. 2, and FIG. 11 to FIG. 13, the above-mentioned transmission mechanism is formed by combining a transmission rod 12, a connection rod 14 and a roller component 13. The central portion of one end of the transmission rod 12 is provided with a connection screw hole 12-2, and the central portion of the other end is provided with a connection hole 12-1, and a first fastening screw 12-3 is arranged on the wall of the connection hole. The type and size of the internal thread of the connection screw hole are the same as those of the internal thread of the nut 11 in the connection component. The connection rod 14 includes a thread section 14-1 and a column section 14-2, the connection rod is used for a connection between the transmission rod and the connection component and a connection between the transmission rods. The type and size of the external thread of the threaded section 14-1 are matched with those of the internal thread of the connection screw hole 12-2 provided in the transmission rod. The shape and size of the column section 14-2 are matched with those of the connection hole 12-1 provided in the transmission rod. The column section 14-2 of the connection rod is inserted into the connection hole 12-1 of the transmission rod and then fixed by the first fastening screw 12-3. The roller component 13 includes rollers 13-1, U-shaped installation plates 13-2, axles 13-3 and a roller sleeve 13-4. The number of rollers 13-1 is three, the number of the U-shaped installation plates 13-2 and the number of the axles 13-3 are the same as the number of rollers. Each roller 13-1 is installed on the corresponding axle respectively. Two ends of each axle 13-3 are respectively installed on two side plates of the corresponding U-shaped installation plate 13-2, so that each roller is respectively located between the two side plates of the corresponding U-shaped installation plate. The inner hole of the roller sleeve 13-4 is larger than the outer size of the transmission rod 12 and a second fastening screw 13-5 is arranged on the wall of the roller sleeve. Each U-shaped installation plate is fixedly connected to the outer side of the wall of the roller sleeve 13-4 respectively. The centerlines of two U-shaped installation plates are in a straight line, and the included angles between the centerline of the remaining U-shaped installation plate and the centerlines of the two U-shaped installation plates are both 90°. Each transmission rod 12 is configured with at least a set of roller component 13. The roller sleeves 13-4 of the roller component is sleeved on the transmission rod 12 and is fixed by the second fastening screw 13-5.

As shown in FIG. 1 to FIG. 4, the assembly method of the monitoring system for deformations and destructions of the gas storage are as follows: installing the acoustic emission probe 3 in the probe sleeve 2, contacting the end coated with butter of the acoustic emission probe 3 with the bottom of the probe sleeve 2, making the cable connector 3-1 extend out from the U-shaped notch 2-4 provided on the wall of the probe sleeve; making the end cap 2-2 cover on the upper end surface of the probe sleeve 2, and fixing the end cap 2-2 to the probe sleeve through the fastening screw; placing the probe sleeve 2 installed with the acoustic emission probe in the shell 1, inserting the lower section of the probe sleeve into the guide cylinder 5 provided on the shell and the lower end of the probe sleeve is located outside the shell, the placement position of the probe sleeve 2 is supposed to make the cable connector 3-1 of the acoustic emission probe face an end of the shell; installing the pistons 4-3 of two sets of the hydro-cylinder components in hydro-cylinders 4-1 respectively, fixedly connecting one end of the piston rod 4-2 of each of the two sets of the piston hydro-cylinder components to the piston 4-3, fixedly connecting the other end of the piston rod to a corresponding portion on the top surface of the shaft shoulder, communicating the first oil port of each of the two hydro-cylinders with the hydraulic pump 8 or the oil tank 9 through the first oil pipeline 6, communicating the second oil ports of each of the two the hydro-cylinders 4-1 with the oil tank 9 or the hydraulic pump 8 through the second oil pipeline 7, communicating the hydraulic pump 8 with the oil tank 9 through the oil pipeline, when the first oil port is the oil inlet and the second oil port is the oil return port, installing the hydraulic pressure gauge 17 on the ground pipeline of the first oil pipeline 6; then inserting the column section 14-2 of the connection rod into the connection hole 12-1 of the transmission rod and fixedly connecting the column section and the connection hole by the first fastening screw 12-3, sleeving the roller sleeve 13-4 of the roller component on the transmission rod 12 and fixedly connecting the roller sleeve and the transmission rod by the second fastening screw 13-5, and then combining the threaded section 14-1 of the connection rod with the nut 11. The connection between the probe installation mechanism and the transmission mechanism is realized.

Figure 14:
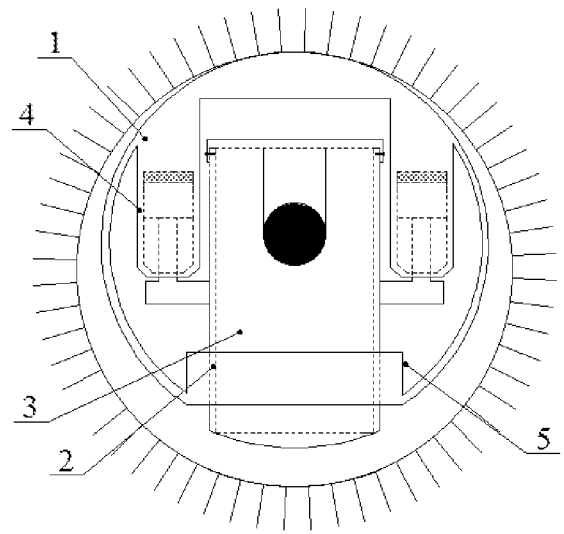
FIG. 14 is a schematic view of a combination of the acoustic emission probe and the probe installation mechanism in an installation state.

As shown in FIG. 2 and FIG. 14, the installation operation of the monitoring system for deformations and destructions of the gas storage are as follows: connecting the first oil ports of two hydro-cylinders 4-1 with the oil tank 9 through the first oil pipeline 6, communicating the second oil ports of two hydro-cylinders 4-1 with the hydraulic pump 8 through the second oil pipeline 7, turning on the hydraulic pump, two pistons 4-3 move to the upper initial point under the action of the pressure oil, at this time, the overall size of the combination of the acoustic emission probe 3 and the probe installation mechanism is smaller than the size of the borehole, and then placing the combination of the acoustic emission probe 3 and the probe installation mechanism in the borehole, and operating the transmission mechanism connected thereto, transmitting the combination of the acoustic emission probe 3 and the probe installation mechanism to the position to be monitored, and thus completing the installation.

Figure 15:
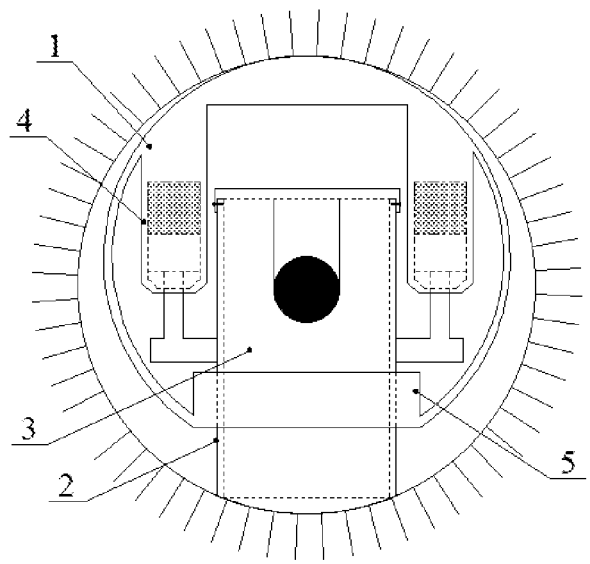
FIG. 15 is a schematic view of the combination of the acoustic emission probe and the probe installation mechanism in a monitoring state.

As shown in FIG. 1 and FIG. 15, the operation of the monitoring system for deformations and destructions of the gas storage in a monitoring state are as follows: communicating the first oil ports of two hydro-cylinders 4-1 with the hydraulic pump 8 through the first oil pipeline 6, communicating the second oil ports of two hydro-cylinders with the oil tank 9 through the second oil pipeline 7, turning on the hydraulic pump, two pistons 4-3 move from the upper initial point to the lower initial point under the action of the pressure oil. During this process, two piston rods 4-2 drives the probe sleeve 2 to move along the direction away from the shell. Thus, the top of the shell 1 and the lower end surface of the probe sleeve are in close contact with the wall of the borehole respectively, achieving effective coupling between the acoustic emission probe and the wall of the borehole. The cable connected to the acoustic emission probe 3 extends to ground surface and is connected to the computer 16 of the ground workstation. The rock (rock mass) condition in the engineering construction may be monitored by the acoustic emission probe 3. The monitoring signal is transmitted to the computer 16 of the ground workstation through the cable. The monitoring signal is processed and displayed in real time through the computer. The pressure change in the hydro-cylinder may be detected by the hydraulic pressure gauge 17. When the decrease in pressure caused by the deformation of the rock mass is found, the hydraulic pump may be used to supply the pressure in the hydro-cylinder, thereby ensuring the acoustic emission probe is always in effective coupling with the rock wall.

Figure 16:
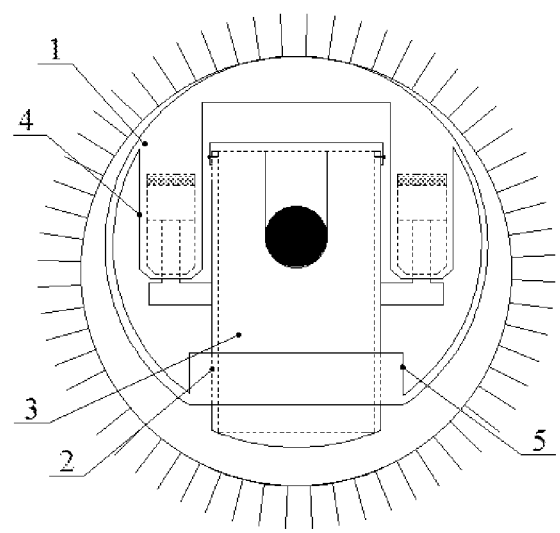
FIG. 16 is a schematic view of the combination of the acoustic emission probe and the probe installation mechanism in a recycling state.

As shown in FIG. 2 and FIG. 16, the recycling operation of the monitoring system for deformations and destructions of the gas storage are as follows: when the monitoring process is completed, communicating the first oil ports of two hydro-cylinders 4-1 with the oil tank 9 through the first oil pipeline 6, communicating the second oil ports of two hydro-cylinders 4-1 with the hydraulic pump 8 through the second oil pipeline 7, turning on the hydraulic pump. Two pistons 4-3 move from the lower initial point to the upper initial point under the action of the pressure oil; during this process, two piston rods drive the probe sleeve and the piston to move in the same direction, the lower end surface of the probe sleeve is separated from the inner wall of the borehole and the overall size of the combination of the acoustic emission probe 3 and the probe installation mechanism recovers to the size at the time of the installation; then operating the transmission mechanism to pull the acoustic emission sensor out of the borehole. The acoustic emission probe and installation mechanism thereof may be reused and recycled.

Besides, a plurality of transmission rods 12 may be successively connected through the connection rods 14 to meet the requirement of the drilling depth, thereby not being affected by the drilling depth and orientation of the mine rock (rock mass). The range of application is expanded.

The invention claimed is:

1. A monitoring system for deformations and destructions of a gas storage, comprising:
    a hydraulic acoustic emission sensor and a ground workstation, the hydraulic acoustic emission sensor is configured to be installed in a borehole of a monitored rock mass, the hydraulic acoustic emission sensor transmits a received monitoring signal to the ground workstation through a cable, the received monitoring signal from the hydraulic acoustic emission sensor is processed and displayed by a computer in the ground workstation, wherein
    the hydraulic acoustic emission sensor comprises acoustic emission probes, probe installation mechanisms and transmission mechanisms transmitting the probe installation mechanisms installed with the acoustic emission probes to a setting position in the borehole, a number of the acoustic emission probes is at least one, a number of the probe installation mechanisms is the same as the number of the acoustic emission probes,
    the ground workstation further comprises a hydraulic pump and an oil tank;
    each of the probe installation mechanisms comprises a shell, a probe sleeve, an end cap, a piston hydro-cylinder component and a connection component;
    the shell is a cylindrical body with two open ends, an inner hole of the shell is provided with a guide cylinder used for combining with the probe sleeve, the guide cylinder is located at a bottom of an inner wall of the shell and an inner hole of the guide cylinder is a through hole penetrating through a wall of the shell, a centerline of the guide cylinder is perpendicular to a centerline of the shell;
    the probe sleeve is a cylinder with a closed lower end and an open upper end, an inner hole of the probe sleeve is in clearance fit with the acoustic emission probe, an outer shape of the probe sleeve is in clearance fit with the inner hole of the guide cylinder, a lower end surface of the probe sleeve is an arc surface matched with an arc of the borehole of the monitored rock mass, an upper end of a wall of the probe sleeve is provided with a notch for extending out a cable connector of the acoustic emission probe, an outer wall of a lower part of the notch is provided with a shaft shoulder;
    there are two sets of the piston hydro-cylinder components, structures of two sets of the piston hydro-cylinder are identical, both of two sets of the piston hydro-cylinder components comprise a piston, a piston rod and a hydro-cylinder, the hydro-cylinders of two sets of the piston hydro-cylinder components are symmetrically arranged on a left upper side and a right upper side of the inner wall of the shell, respectively; axes of two hydro-cylinders are parallel to an axis of the guide cylinder, and the axes of two hydro-cylinders and the axis of the guide cylinder are on a same plane, a distance between inner sides of two hydro-cylinders are larger than a size of the end cap;
    there are two sets of the connection components, the two sets of the connection components are respectively installed at both ends of the shell;
    the acoustic emission probe is installed in the probe sleeve, and the cable connector of the acoustic emission probe extends from the notch provided in the wall of the probe sleeve; the end cap covers an upper end surface of the probe sleeve and is detachably connected to the probe sleeve; the probe sleeve installed with the acoustic emission probe is placed in the shell, a lower section of the probe sleeve is inserted into the guide cylinder provided on the shell and the a lower end of the probe sleeve is located outside the shell, a placement position of the probe sleeve is supposed to make the cable connector of the acoustic emission probe face an end of the shell; in each of the two sets of the piston hydro-cylinder components, the piston is installed in the hydro-cylinder; in each of the two sets of the piston hydro-cylinders, a first end of the piston rod is fixedly connected to the piston, and a second end of the piston is fixedly connected to a corresponding portion of a top surface of the shaft shoulder, oil inlets of the hydro-cylinders of the two sets of the piston hydro-cylinder components communicate with the hydraulic pump through an oil pipeline, oil return ports of the hydro-cylinders communicate with the oil tank through the oil pipeline;
    the transmission mechanism is connected to the connection component installed on the shell.

2. The monitoring system for the deformations and the destructions of the gas storage according to claim 1, wherein the connection component comprises
    a nut and at least two connection brackets, a first end of each of the connection brackets is evenly distributed around an outer wall of the nut and hinged with the outer wall of the nut, a second end of each of the connection brackets is fixedly connected to the shell.

3. The monitoring system for the deformations and the destructions of the gas storage according to claim 2, wherein the shell is formed by combining two semi-cylinders.

4. The monitoring system for the deformations and the destructions of the gas storage according to claim 2, wherein the notch provided at the upper end of the wall of the probe sleeve and used for extending out the cable connector of the acoustic emission probe is a U-shaped notch.

5. The monitoring system for the deformations and the destructions of the gas storage according to claim 2, wherein a lower end surface of the acoustic emission probe in contact with a bottom of the probe sleeve is coated with a coupling agent.

6. The monitoring system for the deformations and the destructions of the gas storage according to claim 2, wherein
    the transmission mechanism is formed by a combination of a transmission rod, a connection rod and a roller component;
    a central portion of a first end of the transmission rod is provided with a connection screw hole, a central portion of a second end of the transmission rod is provided with a connection hole, and a first fastening screw is arranged on a wall of the connection hole, a type and a size of an internal thread of the connection screw hole are the same as a type and a size of an internal thread of the nut in the connection component;

the connection rod comprises a thread section and a column section, the connection rod is used for a connection between the transmission rod and the connection component and a connection between the transmission rods, a type and a size of an external thread of the thread section are matched with the type and a size of the internal thread of the connection screw hole provided on the transmission rod, a shape and a size of the column section are matched with a shape and a size of the connection hole provided on the transmission rod, the column section of the connection rod is inserted into the connection hole of the transmission rod and then the connection rod is fixed by the first fastening screw;

the roller component comprises rollers, U-shaped installation plates, axles and a roller sleeve, a number of the rollers is two or three, a number of the U-shaped installation plates and a number of the axles are the same as the number of the rollers, each of the rollers is respectively installed on the corresponding axle, both ends of each axle are respectively installed on two side plates of a corresponding U-shaped installation plate, so that each of the rollers is respectively located between two side plates of the corresponding U-shaped installation plate, an inner hole of the roller sleeve is larger than an outer size of the transmission rod and a second fastening screw is arranged on a wall of the roller sleeve, each of the U-shaped installation plates is respectively fixedly connected to an outer side of the wall of the roller sleeve, when the number of the U-shaped installation plates is two, an included angle between centerlines of the two U-shaped installation plates is 120° to 135°, when the number of the U-shaped installation plates is three, centerlines of two of the three U-shaped installation plates are in a straight, included angles between a centerline of a remaining U-shaped installation plate and the centerlines of the two U-shaped installation plates are both 90°;

at least one roller component is configured on each of the transmission rods, the roller sleeve of the roller component is sleeved on the transmission rod and the roller sleeve is fixed by the second fastening screw.

7. The monitoring system for the deformations and the destructions of the gas storage according to claim 6, wherein the shell is formed by combining two semi-cylinders.

8. The monitoring system for the deformations and the destructions of the gas storage according to claim 6, wherein the notch provided at the upper end of the wall of the probe sleeve and used for extending out the cable connector of the acoustic emission probe is a U-shaped notch.

9. The monitoring system for the deformations and the destructions of the gas storage according to claim 6, wherein a lower end surface of the acoustic emission probe in contact with a bottom of the probe sleeve is coated with a coupling agent.

10. The monitoring system for the deformations and the destructions of the gas storage according to claim 1, wherein the shell is formed by combining two semi-cylinders.

11. The monitoring system for the deformations and the destructions of the gas storage according to claim 10, wherein a lower end surface of the acoustic emission probe in contact with a bottom of the probe sleeve is coated with a coupling agent.

12. The monitoring system for the deformations and the destructions of the gas storage according to claim 1, wherein the notch provided at the upper end of the wall of the probe sleeve and used for extending out the cable connector of the acoustic emission probe is a U-shaped notch.

13. The monitoring system for the deformations and the destructions of the gas storage according to claim 12, wherein a lower end surface of the acoustic emission probe in contact with a bottom of the probe sleeve is coated with a coupling agent.

14. The monitoring system for the deformations and the destructions of the gas storage according to claim 1, wherein a lower end surface of the acoustic emission probe in contact with a bottom of the probe sleeve is coated with a coupling agent.

* * * * *